Jan. 9, 1968  H. C. CRAGGS  3,363,002
MANUFACTURE OF DIARYL OXIDES FROM PHENOLS
Filed Sept. 4, 1964
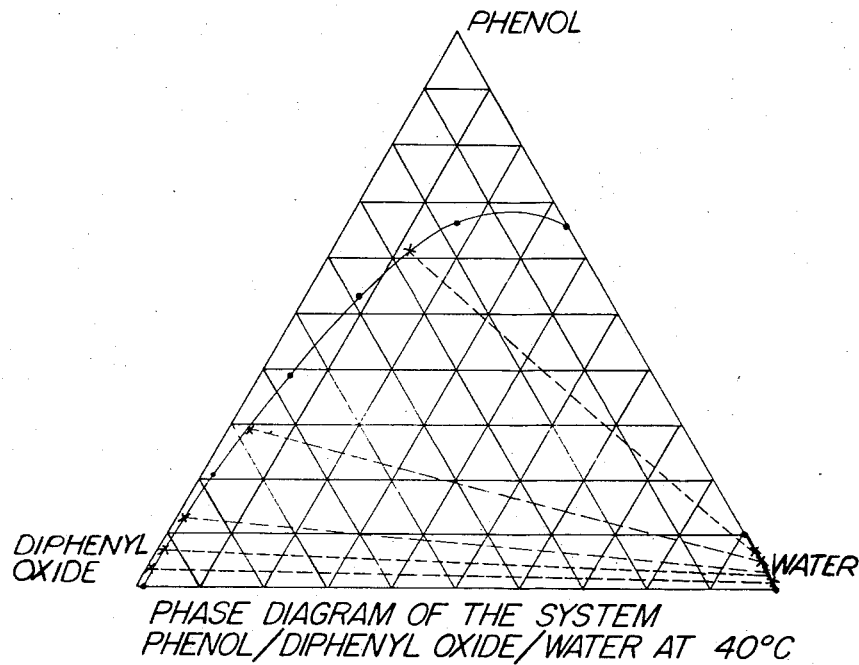
PHASE DIAGRAM OF THE SYSTEM
PHENOL/DIPHENYL OXIDE/WATER AT 40°C
Inventor
HAROLD CLEVELAND CRAGGS
By
Attorneys

United States Patent Office 3,363,002
Patented Jan. 9, 1968

3,363,002
MANUFACTURE OF DIARYL OXIDES FROM PHENOLS
Harold Cleveland Craggs, Norton-on-Tees, England, assignor to Imperial Chemical Industries Limited, London, England, a corporation of Great Britain
Filed Sept. 4, 1964, Ser. No. 394,540
Claims priority, application Great Britain, Sept. 23, 1963, 37,351/63
3 Claims. (Cl. 260—612)

This invention relates to the manufacture of diaryl oxides from phenols.

The production of diaryl oxides from phenols may be illustrated by the following equation:

$$2ArOH \rightleftharpoons Ar_2O + H_2O$$

where Ar is a phenyl or substituted phenyl radical, for example an alkyl phenyl radical, the product of the process usually being a mixture of diaryl oxide, water and the starting phenol. This product mixture is usually distilled to produce a distillate comprising the phenol and water, the diaryl oxide being recovered as a bottoms product. It is usually desirable to return the phenol free from water to the reactor in order to produce further diaryl oxide.

The most convenient method of drying the phenol recovered as a distillate as above, is by further distillation, whereby there is usually recovered a distillate containing phenol and water. For example, in the case of phenol itself an azeotrope may be obtained containing approximately 9% to 10% of phenol and the remainder of water. Normally the dried phenol remains as a bottoms product although where a very large excess of water was originally present, the residue may be water. The phenol-water mixture produced by this means may contain too little phenol to justify further treatment by known processes if the mixture is produced in small quantities. It is, however, frequently difficult and costly to dispose of such phenolic wastes.

An object of the present invention is to provide a convenient and inexpensive method of recovering phenols from aqueous waste liquids.

According to the present invention therefore there is provided a process for the dehydration of a phenol to a diaryl oxide in which phenol unreacted in the process is recovered from an aqueous solution by contacting the said solution with a diaryl oxide at a sufficient temperature to maintain the diaryl oxide in the liquid state, separating the diaryl oxide phase from the aqueous phase, and subsequently separating said phenol from the diaryl oxide in a product distillation column of the phenol dehydration process. Suitable aqueous phenolic solutions which may be contacted with the diaryl oxide are those solutions containing a minor proportion of the phenol which are produced as a by-product in drying by distillation the phenol recovered from the reaction product of the diaryl oxide process.

The phenol/diaryl oxide phase may be passed to the product distillation column either directly or indirectly, for example via the reactor, or it may be used to strip other phenolic solutions of the same phenol before being so returned.

The temperature at which contact of the solution with the diaryl oxide is carried out is preferably as low as is consistent with achieving a high rate of separation of phenol from the aqueous phase whilst maintaining the diaryl oxide in a liquid condition. Temperatures between 30 and 60° C. are particularly suitable.

Processes to which this invention is applicable are those in which phenol or a substituted phenol and in particular an alkyl substituted phenol is reacted to produce the corresponding diphenyl oxide.

In processes according to the present invention in which diphenyl oxide is produced from phenol, the invention may be carried out by reference to the accompanying figure. The figure is a phase diagram of the standard type illustrating the behaviour of the system phenol/diphenyl oxide/water at 40° C. and is provided with tie lines.

Data for the system were obtained as follows:

Liquid-liquid equilibria of the phenol/water/diphenyl oxide system were determined at 40° C. The phase boundaries were obtained by the usual method of "cloud-point" titrations using a phenol/water mixture as titrant whenever necessary. The tie-lines were determined by analysis of the phases obtained from mixtures of known composition.

Data for the partition of phenol at different temperatures between diphenyl oxide and water were obtained by measuring the ratio of the weight percent phenol in the organic and aqueous phases respectively which were obtained from a given mixture (20 weight percent phenol, 63 weight percent water, 17 weight percent diphenyl oxide) at various temperatures. The results are given in the table from which it can be seen that the extraction of phenol from aqueous solutions, using diphenyl oxide as extractant, is more effective at lower temperatures.

TABLE

Effect of temperature on partition of phenol

| Temperature, ° C.: | Weight percent phenol in organic phase / Weight percent phenol in aqueous phase |
|---|---|
| 40 | 7.3 |
| 60 | 6.1 |
| 70 | 5.6 |
| 90 | 4.7 |

Numerous ways of carrying out the separation of phenol from water using diphenyl oxide may be used. For example, the phenol/water solution may be equilibrated with successive small quantities of diphenyl oxide, but it is usually more convenient to carry out the process by countercurrent extraction of the phenolic liquor with diphenyl oxide in a column or columns of standard type.

A particular form of the process of the invention is as follows. Phenol is preheated to between 400 and 500° C. and passed through a reactor containing a thoria catalyst at substantially atmospheric pressure. The products emerging from the catalyst bed comprising approximately 40% diphenyloxide, 55% phenol and byproducts and 5% water are condensed and separated by distillation. In a first distillation column all the phenol and water are taken off overhead and the bottoms product consisting of diphenyl oxide and byproducts passed to a second distillation column where pure diphenyl oxide is distilled off. The phenol and water overhead fraction from the first column is further distilled to yield phenol which is recycled and a phenol/water fraction which is submitted to a continuous extraction process using diphenyl oxide as extractant. The diphenyl oxide/phenol layer is recycled to the reactor, the water layer being discarded.

The extraction stage of the process is further described in the example.

Example

Diphenyl oxide (20 gm.) and a solution of phenol (35 gm.) in water (65 gm.), each at 40° C., were mixed and stirred for 5 minutes. After settling, the layers were separated and analysed; the analyses were as follows:

(a) Top layer (56 gm.):      Percent wt./wt.
 Phenol _____ 55.5
 Diphenyl oxide _____ 35.5
 Water _____ 9.5

(b) Bottom layer (64 gm.):
 Phenol _____ 7.5
 Water _____ 92.5

In this example 89% of the phenol originally in aqueous solution has been removed by the diphenyl oxide.

I claim:
1. A process for the production of diphenyl oxide from phenol which comprises:
   (a) dehydrating the phenol at a temperature of 400–500° C. to produce a crude reaction product comprising diphenyl oxide, unchanged phenol and water,
   (b) distilling the product to produce diphenyl oxide and a mixture of phenol and water,
   (c) distilling the mixture of phenol and water to produce a phenol/water azeotrope,
   (d) contacting the azeotrope with diphenyl oxide at a temperature between 30° and 60° C. to maintain the diphenyl oxide in liquid state to produce a diphenyl oxide phase and an aqueous phase,
   (e) separating the diphenyl oxide phase from the aqueous phase,
   (f) recirculating the diphenyl oxide phase to process stages (a), (b) or (d).

2. A process according to claim 1 in which the diphenyl oxide is contacted countercurrently with the said azeotrope.

3. A process for the production of diphenyl oxide which comprises preheating phenol to a temperature within the range 400 to 500° C. and passing said phenol over a thoria catalyst at substantially atmospheric pressure, whereby a product containing diphenyl oxide is produced, distilling said product in a first distillation stage whereby a mixture of phenol and water are taken off overhead leaving a bottoms product, and distilling said bottoms product from said first distillation stage in a second distillation stage, whereby substantially pure diphenyl oxide is distilled off, and distilling said mixture of phenol and water from said first distillation stage in a third distillation stage, whereby phenol, and a phenol/water fraction containing a minor proportion of phenol are obtained, recycling said phenol to said catalyst and continuously extracting said phenol/water fraction with diphenyl oxide at a temperature within the range 30 to 60° C., whereby a diphenyl oxide phase and an aqueous phase are formed and separating said diphenyl oxide phase from said aqueous phase and subsequently separating phenol from said diphenyl oxide phase in one of said distillation stages of the process.

References Cited

UNITED STATES PATENTS 2,209,872   7/1940   Buchheim et al. _____ 260—627

OTHER REFERENCES

Murat, Parfumerie Mod. (1922) T. 15, No. 3, pp. 51–52, 308.8, p. 412.

LEON ZITVER, *Primary Examiner.*

H. MARS, *Assistant Examiner.*